United States Patent
Scott et al.

(10) Patent No.: US 7,789,088 B2
(45) Date of Patent: Sep. 7, 2010

(54) CIGARETTE FILTERS INCLUDING LATEX BONDED NONWOVEN FABRIC

(75) Inventors: Paul Scott, Epsom (GB); Ralf Klug, Lohmar (DE)

(73) Assignee: Celanese International Corp., Dallas, TX (US)

( * ) Notice: Subject to any disclaimer, the term of this patent is extended or adjusted under 35 U.S.C. 154(b) by 411 days.

(21) Appl. No.: 11/488,223

(22) Filed: Jul. 18, 2006

(65) Prior Publication Data

US 2006/0255491 A1 Nov. 16, 2006

Related U.S. Application Data

(62) Division of application No. 10/723,537, filed on Nov. 26, 2003, now abandoned.

(51) Int. Cl.
*A24B 15/00* (2006.01)

(52) U.S. Cl. ............ 131/331; 131/345

(58) Field of Classification Search ............ None
See application file for complete search history.

(56) References Cited

U.S. PATENT DOCUMENTS

| 5,252,663 | A | | 10/1993 | Chandran et al. ............ 524/813 |
|---|---|---|---|---|
| 5,633,334 | A | * | 5/1997 | Walker et al. ............... 526/202 |
| 5,706,833 | A | | 1/1998 | Tsugaya et al. ............. 131/332 |
| 5,927,287 | A | | 7/1999 | Matsumura et al. ......... 131/345 |
| 6,372,004 | B1 | * | 4/2002 | Schultink et al. ............. 55/382 |

* cited by examiner

*Primary Examiner*—Philip C Tucker
*Assistant Examiner*—Michael J Felton
(74) *Attorney, Agent, or Firm*—Michael W. Ferrell

(57) ABSTRACT

A cigarette filter having a consolidated nonwoven fabric with an aqueous based polymer binder. The polymer binder comprises one or more polymer compositions and is stabilized by one or more high molecular weight protective colloids. While the binder may be utilized with unconsolidated nonwoven fabric webs made by a variety of methods, the binder is particularly useful for application to webs made via the latex bonded airlaid or multibonded airlaid methods.

23 Claims, No Drawings

CIGARETTE FILTERS INCLUDING LATEX BONDED NONWOVEN FABRIC

CLAIM FOR PRIORITY

This application is a divisional patent application of U.S. Ser. No. 10/723,537, filed Nov. 26, 2003 now abandoned entitled "Method of Producing Latex Bonded Nonwoven Fabric." The priority of the foregoing application is hereby claimed.

FIELD OF THE INVENTION

The present invention is directed to cigarette filters which include bonded nonwoven fabric. The fabric may be consolidated via various methods, including the latex bonded airlaid and multibonded airlaid methods and may then be converted to produce the filters for cigarettes.

BACKGROUND OF THE INVENTION

Nonwoven fabrics comprise filaments or fibers that are consolidated by a means other than traditional textile technologies and may be utilized in a wide variety of applications requiring a wide variety of properties. Generally, nonwoven fabrics differ from traditional textiles in that nonwoven fabrics do not depend upon the interlacing of yarn for internal cohesion, as do traditional textiles. Nonwoven fabrics comprise fibers or filaments that may be natural, man-made or mineral in origin, or mixtures thereof. The fibers or filaments may be deposited in a web, at random, or orientated in specific directions. The web commonly has little or no strength as first laid down and must be consolidated by external mechanical, thermal or chemical means. The structural integrity of the nonwoven fabric is thus obtained by an external consolidation of the fibers and filaments.

Nonwoven webs are typically formed through a variety of processes. One commonly utilized method for forming nonwoven fabric webs is the latex bonded airlaid method. In the latex bonded airlaid method, fibers that are usually short in length are fed into a forming head via an air stream. The fibers travel along with the air stream until they reach a moving wire upon which they are laid down to form a randomly orientated web. A variety of different types of fibers may be utilized in this method, however short fluff pulp fibers (typically 3-12 mm in length sourcing from treated or untreated pulp) are preferred. The latex bonded airlaid method provides fast manufacturing speeds and produces nonwoven fabrics that are useful in absorbent products and filters/filtration. A variation of the latex bonded airlaid method is the multibonded airlaid method in which low melting synthetic fibers are used to consolidate the cellulosic fibers with a low level binder on either face of the web to control dusting. A third method of forming nonwoven fabric webs is the drylaid carded method. The drylaid carded method is a mechanical process in which bales of fibers are mixed and then combed into a web by a carding machine. The drylaid method favors long, crimped synthetic fibers in order to achieve entanglement.

A further method of forming nonwoven fabric webs is the wetlaid method. In the wetlaid method a dilute slurry of water and fibers is deposited on a moving wire screen and systematically dewatered to form the base web. The wetlaid method can be utilized with a broad range of fiber types. The spunlaid method produces fabric webs by extruding molten polymer granules through spinnerets. The filaments are cooled and deposited onto a moving conveyor to form a web. Other web-forming methods include the meltblown method, in which thermoplastic polymer granules are extruded into a high velocity airstream, solidified and broken into a fibrous web and the flashspun method in which a polymer is dissolved in a solvent and sprayed into a collecting vessel. The polymer/solvent mixture is decompressed by passing through spinnerets and the solvent is then flashed off to leave a network of fibers. The web produced by the spunlaid method has some limited structural integrity, but generally not sufficient consolidation to produce a viable fabric.

Typically, drylaid webs, both airlaid and carded, together with wetlaid have little strength in their unconsolidated form and require external chemical, thermal or mechanical consolidation to provide strength. The process and binder of the present invention are primarily utilized in the chemical consolidation process. In the chemical consolidation process a liquid-based bonding agent is applied to the web. The binder is typically an emulsion, produced by the process of emulsion polymerization that contains one or more monomers that are stabilized with water-based surfactants, colloids or both. In practice, water-soluble initiators are added and the monomer polymerizes to produce a dispersion of solid particles in water. The process is exothermic and the water enables heat transfer during the reaction and provides an acceptable carrier for the polymer. In addition to providing consolidation, the binder imparts many other varying properties to the web. For example, the binder may add functionality, such as antimicrobial properties, to the web and it may add properties such as durability, softness or stiffness and color/opacity.

The binder may be applied to the web via various methods. One method of application is the air-spray bonding method in which the binder is fed from a sealed pressurized vessel through a spray boom into spray nozzles that atomize the binder over the web to provide a homogeneous distribution over the fibers. The airlaid air-spray bonding method alternates steps of passing the web through spray nozzles and drying/curing ovens. For airlaid air-spray bonding, the binder is typically diluted to between 10 to about 35% non-volatile content in order to achieve satisfactory atomization. Nonwoven fabrics can be used in the manufacture of cigarette filter tips. Such manufacture is usually undertaken at high speed and the binders must not include ingredients that are prohibited by the regulatory requirements of the country of manufacture. Traditionally, cellulose acetate fibers have been utilized as cigarette filter tips, however these fibers do not always meet all regulatory requirements. Further, cellulose acetate fibers produce inhalable dust during converting that could potentially lead to health and safety issues for the manufacturer. Finally, cellulose acetate fibers are generally not considered to offer sufficient resiliency for the end use application.

For these reasons, it would be advantageous to provide a binder composition and method of application of the binder composition for the manufacture of nonwoven fabrics that would reduce or eliminate the existing disadvantages in the existing processes for manufacturing nonwoven materials for use in cigarette filters. In particular, it would be advantageous to provide a polymer binder and method for applying the binder to consolidate cellulosic fluff pulp fibers, wherein the polymer binder comprises materials that are allowed for use in cigarette filters by the regulatory agencies of many countries.

SUMMARY OF THE INVENTION

The present invention provides a cigarette filter which includes a nonwoven fabric that has an aqueous based polymer binder. The polymer binder comprises one or more polymers and is either a homopolymer or copolymer and stabilized with one or more stabilizing agents, e.g., high molecular weight protective colloids. The polymers and the stabilizing agent should be acceptable for use as cigarette filters under the regulatory requirements of most countries. While the binder may be utilized with unconsolidated nonwoven fabric webs made by a variety of methods, the binder is particularly useful for webs made via the latex bonded airlaid and multibonded airlaid methods.

DETAILED DESCRIPTION OF THE PREFERRED EMBODIMENTS

The present invention discloses an aqueous based polymer binder in the form of an emulsion polymer for application to fibers, filaments and other filling materials in order to consolidate them into nonwoven fabrics, and in particular fabrics for use as cigarette filters. The binder is formed of synthetic polymer particles that are dispersed in water. The dispersion may be formed via various means known to those skilled in the art, including emulsion polymerization, inverse emulsion polymerization, suspension polymerization and the dispersion of particles into water which are stabilized using colloid stabilizers, surfactants or both, where colloids are the preferred species. Conventional batch, semi-batch or semi-continuous polymerization procedures may be utilized. Generally, monomers are polymerized in an aqueous medium in the presence of an initiator system and at least one stabilizing agent, such as a high molecular weight protective colloid, to form the emulsion polymer binder. To control the generation of free radicals during the polymerization process, a transition metal, such as an iron salt, is often used.

The polymer of the binder may be either a copolymer or a homopolymer. As used herein, a copolymer is a polymer formed from two or more different monomers and may have random, block, tapered block or other known architecture, which is in contrast to a homopolymer which contains solely one monomer. The monomers that may be utilized with the invention include ethylene, vinyl acetate, and vinyl esters of aliphatic carboxylic acids containing chain lengths of up to $C_{18}$. The compositions that would result from the polymerization of the monomers include vinyl acetate homopolymers, vinyl acetate/ethylene copolymers, and copolymers of vinyl acetate with vinyl esters of long-chain saturated aliphatic carboxylic acids with chain lengths up to $C_{18}$, e.g. vinyl acetate/veova copolymers. Compositional examples would include vinyl acetate homopolymers consisting solely of 100 percent vinyl acetate, copolymers of vinyl acetate and ethylene in the ratios of vinyl acetate to ethylene of (99 to 65) to (1 to 35), copolymers of vinyl acetate with veova in the ratios vinyl acetate (99 to 70) and veova (1 to 30). These polymer compositions are preferred because they are permitted for use in items such as cigarette filters by the regulatory agencies of many countries. Vinyl acetate/ethylene copolymers are most preferred for use in the binder for the consolidation of webs of fluff pulp used to manufacture cigarette filters.

A stabilizing system of a high molecular weight protective colloid is utilized in conjunction with the monomer or monomers. Preferred high molecular weight protective colloids include polyvinyl alcohol, ethylcellulose, hydroxyethylcellulose, methylcellulose, hydroxymethylcellulose, carboxymethylcellulose, sodium, potassium, and magnesium salts of carboxymethylcellulose, dextrins, gum arabic and mixtures thereof. These high molecular weight protective colloids are preferred because they are permitted for use in items such as cigarette filters by the regulatory agencies of many countries. Polyvinyl alcohols are preferred for stabilizing the binder used to consolidate fluff pulp used to manufacture nonwoven fabric for use in cigarette filters. The stabilizing system preferably in within the range of about 1 to about 15 parts per hundred of the monomer. It should be noted that low molecular weight emulsifying agents i.e. surfactants are not permitted by the regulations of many countries for use in cigarette filters. The binder may also optionally contain certain types of preservatives providing they are food contact approved, and the binder should be in compliance with regulatory requirements such as the US Food and Drug Agency's regulations 175.105/176.170/176.180 and the German Tobacco Ordinance (Deutsche Tabakverordnung).

The binder emulsion formed with the above monomer and stabilizing system has a solids level in the range of about 35 to about 60 percent and most preferably in the range of about 45 to about 55 percent. The emulsion may be further diluted with water if desired. The binder has a Tg (Glass transition temperature) in the range of about −40° C. to about +40° C. and preferably in the range of about −20° C. to about 35° C. The binder is applied to the fibers, filaments and other filling materials of the web to produce the nonwoven fabric in the range of about 70 to about 98 parts by weight dry fibers/fillers to about 30 to about 2 parts by weight of dry binder being illustrative of both latex bonded airlaid and multibonded airlaid configurations.

Typical examples of physical properties of latex bonded airlaid fabric for use as cigarette filters are as follows:

Basis weight (grams per square meter) in the range of about 40 to about 70 gsm with a preferred weight in the range of about 50 to about 60 gsm.

Caliper in millimeters in the range of about 0.7 to about 1.5 where the preferred caliper is in the range of about 0.8 to about 1.3 mm.

Dry strength in the Machine direction (MD) in Newtons per 5 cm in the range of about 5 to about 25 N/5 cm with preferred dry strength in the range of about 10 to about 20 N/5 cm at a tensiometer separation speed of 100 millimeters per minute.

While not intending to be limited in any manner, the present invention may be better understood by reference to the following example.

Example

Six webs of cellulosic fluff pulp fibers were formed via the airlaid method. The webs were each consolidated with a polymer binder according to the present invention. The results are shown in Table 1.

TABLE 1

Latex bonded Airlaid nonwoven fabric - configuration details after consolidation

| Polymer Binder* | Basis Wt (gsm) | Thickness (Caliper in mm) | Density (g/cm$^{-3}$) | Dry Tensile (MD, N/5 cm) | Wet Tensile (MD, N/5 cm) | Dry Elongation (%) | Dry Fiber to Binder Ratio |
|---|---|---|---|---|---|---|---|
| VA | 56.9 | 1.05 | 0.054 | 17.6 | 4.6 | 8 | 85:15 |
| VA/E (8% E) | 54.6 | 0.95 | 0.057 | 15.6 | 3.5 | 11 | 85:15 |
| VA/E (12% E) | 54.0 | 0.95 | 0.057 | 14.1 | 1.4 | 15 | 85:15 |
| VA/E** (16% E) | 55.1 | 1.05 | 0.052 | 8.8 | 0.7 | 17 | 88:12 |
| VA/E (16% E) | 56.3 | 1.00 | 0.056 | 11.2 | 1.1 | 15 | 85:15 |
| VA/E (16% E) | 55.8 | 1.00 | 0.056 | 18.3 | 1.4 | 18 | 82:18 |

*All are colloid stabilized
VA = Vinyl Acetate
E = Ethylene

As shown in Table 1, the application of a binder in the ratio of about 12 to about 18 (dry weight) with fibres in the ratio of 88 to 82 (dry weight) to form a web results in a nonwoven fabric having acceptable tensile strength and elongation percentage for converting purposes. Further, all of the configurations, with the exception of the binder/structure marked with , resulted in a nonwoven fabric that did not produce any dust during converting. This is in contrast to the known cellulose acetate fibers that produce dusting during converting. The binder/structure marked  produced only a slight amount of dust during converting.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

We claim:

1. A cigarette filter which comprises an airlaid nonwoven fabric that includes cellulosic fibers and an aqueous based polymer binder, said binder having one or more polymer compositions and one or more stabilizing agents, where the stabilizing agent is present in amounts of from 1 to 15 parts per hundred weight monomer content of the polymer composition, and wherein the nonwoven fabric comprises in the range of about 30 to about 2 parts by dry weight of the binder and in the range of about 70 to about 98 parts by dry weight of the fibers and other filling components; the cigarette filter having a construction further characterized in that the fabric from which it is made has a basis weight (grams per square meter) in the range of about 40 to about 70 gsm, caliper in millimeters in the range of about 0.7 to about 1.5 millimeters, and a dry strength in the Machine direction (MD) in Newtons per 5 cm in the range of about 5 to about 25 N/5 cm at a tensiometer separation speed of 100 millimeters per minute.

2. The cigarette filter according to claim 1, wherein the fibers comprise fluff pulp fibers.

3. The cigarette filter according to claim 1, wherein the one or more stabilizing agents are high molecular weight protective colloids.

4. The cigarette filter according to claim 3, wherein the high molecular weight protective colloids are selected from the group consisting of polyvinyl alcohol, ethylcellulose, hydroxyethylcellulose, methylcellulose, hydroxymethylcellulose, carboxymethylcellulose, sodium potassium and magnesium salts of carboxymethylcellulose, dextrins, gum arabic and mixtures thereof.

5. The cigarette filter according to claim 4, wherein the high molecular weight protective colloids comprise polyvinyl alcohol.

6. The cigarette filter according to claim 1, wherein the polymer binder is substantially free of surfactants.

7. The cigarette filter according to claim 1, wherein the stabilizing agent consists of protective colloids.

8. The cigarette filter according to claim 1, wherein the aqueous based polymer binder comprises from about 87 wt. percent to about 99 wt. percent of a water insoluble polymer, on a dry basis.

9. The cigarette filter according to claim 8, wherein the water insoluble polymer is prepared by emulsion polymerization, inverse emulsion polymerization, or suspension polymerization.

10. The cigarette filter according to claim 9, wherein the water insoluble polymer is prepared by emulsion polymerization.

11. The cigarette filter according to claim 10, wherein the emulsion is formed at a solids level in the range of about 35 to about 60 percent.

12. The cigarette filter according to claim 1, wherein the binder comprises one or more polymer compositions selected from the group consisting of vinyl acetate homopolymers, ethylene vinyl acetate copolymers, copolymers of vinyl acetate with vinyl esters of long-chain saturated aliphatic carboxylic acids with lengths up to $C_{18}$, vinyl acetate/veova copolymers and mixtures thereof.

13. The cigarette filter according to claim 1, wherein the one or more polymers are polymerized from monomers selected from the group consisting of ethylene, vinyl acetate, vinyl esters of aliphatic carboxylic acids having chain lengths up to $C_{18}$ and mixtures thereof.

14. The cigarette filter according to claim 1, wherein the one or more polymers includes a copolymer with from 1 to 25 percent ethylene monomer and from 65 to 99 percent vinyl acetate monomer.

15. The cigarette filter according to claim 8, wherein the water insoluble polymer has a Tg in the range of from about −20° C. to 35° C.

16. A cigarette filter that includes a nonwoven web that is bonded with an aqueous based polymer binder which has a solids content that consists essentially of a polymer composition and a protective colloid stabilizing agent in the form of a cigarette filter.

17. The cigarette filter according to claim 16, wherein the protective colloid is selected from the group consisting of polyvinyl alcohol, cellulose ethers, and combinations thereof.

18. The cigarette filter according to claim 16, wherein the polymer binder is substantially free of surfactants.

19. A method of producing cigarette filters comprising the steps of
   (1) forming a nonwoven fabric comprising fluff pulp fibers, and optionally other filling components, via the latex bonded airlaid or multibonded airlaid method and coating the web with an aqueous based polymer binder which consists essentially of:
      a) water;
      b) one or more water-insoluble polymer compositions; and
      c) from 1 to 15 parts per hundred weight monomer of one or more protective colloids, based on the monomer content of the polymer composition;
   wherein the nonwoven fabric comprises in the range of about 30 to about 2 parts by dry weight of the binder and in the range of about 70 to about 98 parts by dry weight of the fibers and other filling components, and wherein the binder, fibers and filling components are acceptable for use in cigarette filter applications; the nonwoven fabric having a construction further characterized in that the fabric has a basis weight (grams per square meter) in the range of about 40 to about 70 gsm, caliper in millimeters in the range of about 0.7 to about 1.5 millimeters, and a dry strength in the Machine direction (MD) in Newtons per 5 cm in the range of about 5 to about 25 N/5 cm at a tensiometer separation speed of 100 millimeters per minute; and
   (2) including the nonwoven fabric in a cigarette filter.

20. The cigarette filter according to claim 1, wherein the fabric has a basis weight of from about 50 gsm to about 60 gsm.

21. The cigarette filter according to claim 1, wherein the fabric has a caliper of from about 0.8 mm to about 1.3 mm.

22. The cigarette filter according to claim 1, wherein the fabric has a dry strength in the range of about 10 to about 20N/5 cm at a tensiometer separation speed of 100 millimeters per minute.

23. The cigarette filter according to claim 1, wherein the fabric has a density of from about 0.026 $g/cm^3$ to about 0.1 $g/cm^3$.

* * * * *